United States Patent [19]

Kondo

[11] Patent Number: 4,581,400

[45] Date of Patent: Apr. 8, 1986

[54] RUBBER COMPOSITIONS MODIFIED WITH BLENDS OF ROSIN MATERIAL

[75] Inventor: Hitoshi Kondo, Tokyo, Japan

[73] Assignee: Bridgestone Corporation, Tokyo, Japan

[21] Appl. No.: 716,310

[22] Filed: Mar. 27, 1985

[30] Foreign Application Priority Data

Mar. 30, 1984 [JP] Japan ................................ 59-60869

[51] Int. Cl.[4] ...................... C08L 23/00; C08L 93/00; C08F 1/00
[52] U.S. Cl. .................................. 524/274; 524/270; 524/764; 524/798; 524/925; 527/600
[58] Field of Search ............... 524/270, 274, 764, 798, 524/925; 527/600

[56] References Cited

U.S. PATENT DOCUMENTS

| | | | |
|---|---|---|---|
| 3,238,164 | 3/1966 | Speck | 524/925 |
| 3,927,144 | 12/1975 | Hayashi et al. | 524/518 |
| 4,272,419 | 6/1981 | Force | 524/274 |
| 4,279,659 | 7/1981 | Unmuth | 524/274 |
| 4,373,041 | 2/1983 | Wood et al. | 524/270 |
| 4,419,470 | 12/1983 | Davis et al. | 524/274 |
| 4,478,993 | 10/1984 | Wideman et al. | 524/270 |
| 4,491,655 | 1/1985 | Sandstrom | 524/270 |

*Primary Examiner*—Herbert S. Cockeram
*Attorney, Agent, or Firm*—Sughrue, Mion, Zinn, Macpeak and Seas

[57] ABSTRACT

A rubber composition comprising (a) 100 parts by weight of a rubber selected from the group consisting of natural rubber and synthetic diene rubbers and (b) about 1 to about 30 parts by weight of a rosin derivative comprising a blend of (i) about 15 to about 50% by weight of a rosin, (ii) about 10 to about 70% by weight of a polymerized rosin and (iii) not more than about 55% by weight of a rosin pitch, each based on the weight of the rosin derivative.

5 Claims, No Drawings

RUBBER COMPOSITIONS MODIFIED WITH BLENDS OF ROSIN MATERIAL

FIELD OF THE INVENTION

The present invention relates to a rubber composition having good cut resistance and low hysteresis loss.

BACKGROUND OF THE INVENTION

On many occasions, a large-sized tire for trucks and buses used on unpaved roads, especially on rough roads where stones and rocks are exposed and an off-road tire used in a quarry, etc., are cut in the tread portion or the sidewall portions thereof. The cut growth results in tire destruction. The cut itself allows rain to penetrate to steel cords reinforcing the tire and to corrode them. Therefore, a rubber composition having good cut resistance is necessary for a large-sized tire and an off-road tire.

It is known to compound a large amount of carbon black in a rubber composition for the tire tread in order to improve cut resistance. However, this method results in bad chipping resistance on rough roads, high hysteresis loss and bad workability in the mixing and extruding processes.

U.S. Pat. No. 3,927,144 discloses that cut resistance is improved with a rubber composition comprising a styrene-butadiene rubber and dicyclopentadiene resin having a softening point of about 50–200 degrees C. and a bromine number of 40–150. However, the use of dicyclopentadiene resin is unsatisfactory to achieve good cut resistance in a styrene-butadiene rubber composition and does not improve the cut resistance of a natural rubber composition which is used for a large-sized tire because of the low hysteresis loss. Accordingly, a need for a new and inexpensive rubber additive continues.

SUMMARY OF THE INVENTION

Accordingly, this invention provides a rubber composition which comprises (a) 100 parts by weight of a rubber selected from the group consisting of natural rubber and synthetic diene rubbers and about 1 to about 30 parts by weight of a rosin derivative comprising about 15 to about 50% by weight of a rosin, (b) about 10 to about 70% by weight of a polymerized rosin and not more than about 55% by weight of a rosin pitch. This rubber composition exhibits improved cut resistance and, therefore, is useful in the production of a large-sized tire and an off-road tire.

DETAILED DESCRIPTION OF THE INVENTION

Suitable rubbers which may be used in the present invention include natural rubber and synthetic diene rubbers. Examples of synthetic diene rubbers include styrene-butadiene (e.g., about 5 to 45 wt % styrene, about 55 to 95 wt % butadiene) rubbers, polyisoprene rubbers, isobutyrene-isoprene rubbers and halogenated (e.g., chlorinated or brominated) isobutyrene-isoprene rubbers. Natural rubber is preferred as the main component (e.g., in an amount of more than about 50% by wt) for the best results in order to achieve not only cut resistance but also low hysteresis loss.

According to the present invention, the rosin can be a tall oil rosin comprising finely fractional distillate of crude tall oil which is a waste fluid in the process of manufacturing kraft pulp, a gum rosin comprising a distillate of raw pine resin and a wood rosin comprising an extract of chipped pine root. Commercial examples of rosins which can be used include Wood Rosin (Hercules Inc.), Hartall R-X, Hartall R-WW and Hartall R-N (Harima Chemicals, Inc.). It is preferred that a rosin contain abietic acid and isomers thereof as the main components (e.g., in an amount of at least about 50% by weight). The isomers are neoabietic acid, dehydroabietic acid, primaric acid, isoprimaric acid, palustric acid and the like. The rosin should be used in such an amount that it is present as a component of the rosin derivative in an amount of between about 15 and about 50% by weight based on the total weight of the rosin derivative. Better results are obtained by using from about 20 to about 40% by weight of the rosin based on the weight of the rosin derivative. The use of less than about 15% by weight of the rosin decreases the weighing efficiency thereof and the mixing and extruding efficiency of the rubber composition obtained.

Polymerized rosin can be produced by polymerization of rosin using a catalyst, such as sulfuric acid, phosphoric acid or boron trifluoride, or a mixed catalyst such as aluminum chloride-zinc chloride in an organic solvent, such as chloroform, carbon tetrachloride and toluene. (See *Industrial and Engineering Chemistry Product Research and Development*, vol. 9, No. 1, pages 60–65, March, 1970). Commercial examples of polymerized rosins include Poly-pale (Hercules Inc.) and Haritac 140 (Harima Chemicals Inc.). It is preferred that for the polymerized rosin to contain dimers of abietic acid and isomers thereof as the main components (e.g., in an amount of at least about 50% by weight). The amount of the polymerized rosin is limited to about 10 to about 70% by weight based on the weight of the rosin derivative. The use of not less than about 10% by weight of the polymerized rosin shows an appreciable improvement in cut resistance and the use of more than about 70% by weight thereof deteriorates the hysteresis loss of the rubber composition obtained. Better results are obtained by using from about 10 to about 50% by weight of the polymerized rosin based on the weight of the rosin derivative.

The rosin pitch which can be used in the present invention, is a black mixture of by-products, produced in the process of manufacturing rosin (see "Composition of Tall Pitch" by B. Holmbom, *Journal of American Chemical Socient*, vol. 55, pages 342–344, March 1978). Commercial examples of rosin pitches include Hartall T P (Harima Chemicals Inc.). It is preferred for the rosin pitch to contain about 20 to about 60% by weight of free acids, about 15 to about 45% by weight of ester compounds and about 15 to about 40% by weight of unsaponifiable matter. Free acids are mainly fatty acids and fatty acid derivatives. Examples of suitable fatty acids include oleic acid and linoleic acid. Examples of suitable fatty acid derivatives include addition products of unsaturated fatty acids. Tall oil pitch which is a by-product of tall oil rosin is easily obtained.

The amount of the rosin pitch in the rosin derivative is limited to not more than about 55% by weight based on the weight of the rosin derivative. It is preferred to use from about 15 to about 55% by weight of the rosin pitch and more preferred to use about 25 to about 45% by weight thereof based on the weight of the rosin derivative. The use of more than about 55% by weight of the rosin pitch decreases the softening point of the rosin derivative and decreases the weighing efficiency thereof and the cut resistance of the rubber composition obtained. The use of less than about 15% by weight of the rosin pitch deteriorates the hysteresis loss thereof.

The rosin derivative (2) used in the present invention is obtained by blending appropriately a rosin, a polymerized rosin and a rosin pitch.

When the softening point of the rosin derivative is low, to the extent the purpose of the present invention is maintained a part of the rosin can be denatured with an acid, such as maleic acid, or petroleum resins having high softening point ($C_5$, $C_9$ resin, etc.) may be blended with the rosin derivative in order to improve workability of the rubber composition.

In the present invention, the amount of the rosin derivative (2) is about 1 to about 30 parts by weight, preferably 3 to 15 parts by weight, based on 100 parts by weight of total amount of rubber (1). If the amount of the rosin derivative is less than about 1 part by weight, the cut resistance of the rubber composition obtained is decreased, while if the amount of rosin derivative exceeds about 30 parts by weight, the hysteresis loss thereof is deteriorated.

The composition according to the present invention may also contain reinforcing fillers, such as carbon black and silica, fillers such as clacium carbonate and clay, vulcanizing agents such as sulfur, sulfur chloride and alkylphenoldisulfide, accelerating agents such as dibenzothiazyldisulfide, N, N'-dicyclohexyl-2-benzothiazolylsulfenamide, N,-oxydiethylene-2-benzothiazole sulfenamide, and diphenylguanidine, activators such as zinc white and stearic acid, softeners such as aromatic oil, naptentic oil and paraffinic oil, tackifiers such as petroleum resin, antioxidants such as polymerized 2,2,4-trimethyl-1,2-dihydroquinoline, and N-phenyl-N'-isopropyl-p-phenylenediamine, and the like employed within usual range of the amount of these additives.

The following examples are given for the purpose of further illustration of the present invention. They are not to be construed, however, as limiting the scope of the present invention.

EXAMPLE 1

Nine different kinds of rosin derivatives were prepared as shown in Table 1 below. These rosin derivatives were compounded at a ratio of 10 parts by weight of rosin derivative to 100 parts by weight of natural rubber in a Banbury mixer as shown below in Table 2, respectively. The rubber compositions were cured and the cut resistance, hysteresis loss and the appearance of tire treads were evaluated. The results obtained are shown in Table 2 below.

In these examples, tall oil rosin was used. The tall oil rosin may be replaced with gum rosin or wood rosin with substantially the same results being obtained.

TABLE 1

| | Example No. | | | | | | | | |
|---|---|---|---|---|---|---|---|---|---|
| | A | B | C | D | E | F | G | H | I |
| Tall Oil Rosin* (% by weight) | 15 | 20 | 40 | 40 | 45 | 10 | 60 | 5 | 40 |
| Polymerized Rosin** (% by weight) | 70 | 50 | 30 | 20 | 10 | 80 | 10 | 30 | 5 |
| Tall Oil Pitch*** (% by weight) | 15 | 30 | 30 | 40 | 55 | 10 | 30 | 65 | 55 |

Note:
The compositions are as follows:
*Abietic Acid: 34% by weight
Isopimaric Acid: 9% by weight
Dehydroabietic Acid: 18% by weight
Neoabietic Acid: 7% by weight
Palustric Acid: 12% by weight
Pimaric Acid: 6% by weight
**It is believed that the composition of the polymerized rosin is about 70% by weight of dimers of abietic acid, neoabietic acid and palustric acid.
***Ester Compounds: about 40% by weight
Fatty Acid: about 3% by weight
Unsaponifiable Matter: about 30% by weight
Fatty Acid Derivatives: about 25% by weight

TABLE 2

| | Rubber Composition No. | | | | | | | | | | |
|---|---|---|---|---|---|---|---|---|---|---|---|
| | 1 Comparative Example | 2 Comparative Example | 3 Example | 4 Example | 5 Example | 6 Example | 7 Example | 8 Comparative Example | 9 Comparative Example | 10 Comparative Example | 11 Comparative Example |
| Natural Rubber | 100 | 100 | 100 | 100 | 100 | 100 | 100 | 100 | 100 | 100 | 100 |
| ISAF Carbon Black | 50 | 50 | 50 | 50 | 50 | 50 | 50 | 50 | 50 | 50 | 50 |
| Stearic Acid | 3 | 3 | 3 | 3 | 3 | 3 | 3 | 3 | 3 | 3 | 3 |
| N—1,3-Dimethylbutyl-N'—phenyl-p-phenylenediamine | 1 | 1 | 1 | 1 | 1 | 1 | 1 | 1 | 1 | 1 | 1 |
| Zinc White | 4.5 | 4.5 | 4.5 | 4.5 | 4.5 | 4.5 | 4.5 | 4.5 | 4.5 | 4.5 | 4.5 |
| N—Oxydiethylene-2-benzthiazyl sulphenamide | 0.6 | 0.6 | 0.6 | 0.6 | 0.6 | 0.6 | 0.6 | 0.6 | 0.6 | 0.6 | 0.6 |
| Sulfur | 2 | 2 | 2 | 2 | 2 | 2 | 2 | 2 | 2 | 2 | 2 |
| Dicyclopentadiene Resin | 10 | — | — | — | — | — | — | — | — | — | — |
| Low Molecular Weight Polystyrene | — | 10 | — | — | — | — | — | — | — | — | — |
| Sample | | | | | | | | | | | |
| A | — | — | 10 | — | — | — | — | — | — | — | — |
| B | — | — | — | 10 | — | — | — | — | — | — | — |
| C | — | — | — | — | 10 | — | — | — | — | — | — |
| D | — | — | — | — | — | 10 | — | — | — | — | — |
| E | — | — | — | — | — | — | 10 | — | — | — | — |
| F | — | — | — | — | — | — | — | 10 | — | — | — |
| G | — | — | — | — | — | — | — | — | 10 | — | — |
| H | — | — | — | — | — | — | — | — | — | 10 | — |
| I | — | — | — | — | — | — | — | — | — | — | 10 |
| Hysteresis Loss | | | | | | | | | | | |
| Room Temp. | 0.247 | 0.292 | 0.296 | 0.290 | 0.285 | 0.273 | 0.268 | 0.304 | 0.295 | 0.273 | 0.259 |
| 100° C. | 0.230 | 0.265 | 0.299 | 0.281 | 0.272 | 0.243 | 0.235 | 0.315 | 0.272 | 0.260 | 0.235 |
| Cut Resistance | 100 | 220 | 450 | 405 | 345 | 300 | 275 | 460 | 280 | 240 | 235 |
| Appearance of Tire Tread | | | | | | | | | | | |

TABLE 2-continued

| | Rubber Composition No. | | | | | | | | | | |
|---|---|---|---|---|---|---|---|---|---|---|---|
| | 1 Comparative Example | 2 Comparative Example | 3 Example | 4 Example | 5 Example | 6 Example | 7 Example | 8 Comparative Example | 9 Comparative Example | 10 Comparative Example | 11 Comparative Example |
| No. of Large Cuts/100 cm² | 7.4 | 6.2 | 2.1 | 2.8 | 3.4 | 5.0 | 5.6 | 2.1 | 5.6 | 4.0 | 6.3 |
| No. of Small Cuts/100 cm² | 25.9 | 20.4 | 5.8 | 8.2 | 10.5 | 12.6 | 14.5 | 5.7 | 12.1 | 11.3 | 19.5 |
| No. of Chipped Pieces/100 cm² | 2.2 | 3.8 | 3.4 | 3.2 | 3.0 | 2.8 | 3.1 | 3.6 | 3.2 | 3.3 | 2.9 |

The test methods used were as follows:

Cut Resistance

To have cuts by the steel edge of a pendulum type impact cut tester was bumped against the rubber compositions from constant height, the depths of the cuts were measured. A cut resistance index was obtained using the following formula:

$$\text{Cut Resistance Index} = \frac{\text{Depth of Cut of Rubber Composition No. 1}}{\text{Depth of Cut of Each Sample}} \times 100$$

The larger the index value, the better the cut resistance is.

Hysteresis Loss

The tan δ values of the rubber compositions were measured at room temperature and 100 degrees C. with a viscoelastometer made by Iwamoto Seisakusho Company. The lower the value, the lower the hysteresis loss.

Appearance of Tire Tread

Tires for truck-bus of a size of 1000-20 where the tread portions used four kinds of rubber compositons as shown in Table 2 were produced. They were driven for 2,000 km and braked frequently on rough roads, such as those in a quarry, which had many rock and stone spurs. The appearance was evaluated by the numbers of large cuts (depths not less than 5 mm), small cuts (depths not less than 1 mm and less than 5 mm) and chipped pieces (more than 25 mm²) per 100 cm² of tire tread surface.

EXAMPLE 2

Seven kinds of rubber compositions as shown in Table 3 were prepared and evaluated by repeating the same procedures as described in Example 1. The test results obtained are shown in Table 3 below.

Not only is cut resistance but also hysteresis loss is improved with the rubber composition of the present invention. Therefore, these compositions are very useful for tire treads, especially tire treads of large-sized tires for truck-bus and off-road tires and may be employed for tire sidewalls or other rubber goods in order to improve cut resistance.

While the invention has been described in detail and with reference to specific embodiments thereof, it will be apparent to one skilled in the art that various changes and modifications therein can be made without departing from the spirit and scope thereof.

What is claimed is:

1. A rubber composition comprising (a) 100 parts by weight of a rubber selected from the group consisting of natural rubber and synthetic diene rubbers and (b) about 1 to about 30 parts by weight of a rosin derivative comprising a blend of (i) about 15 to about 50% by weight of a rosin, (ii) about 10 to about 70% by weight of a polymerized rosin and (iii) not more than about 55% by weight of a rosin pitch, each based on the weight of the rosin derivative.

2. The rubber composition acccording to claim 1, wherein the main component of said rubber (a) is natural rubber.

3. The rubber composition according to claim 1, wherein said rosin (i) contains abietic acid and isomers thereof as the main components.

4. The rubber composition according to claim 1, wherein said polymerized rosin (ii) contains dimers of abietic acid and isomers thereof as the main components.

5. The rubber composition according to claim 1, wherein said rosin pitch (iii) contains about 20 to about 60% by weight of free acids, about 15 to about 45% by weight of ester compounds and about 15 to about 40% by weight of unsaponifiable matter based on the weight of the rosin pitch.

\* \* \* \* \*

TABLE 3

| | Comparative Example 12 | Example No. 13 | Example No. 14 | Example No. 15 | Example No. 16 | Example No. 17 | Comparative Example 18 |
|---|---|---|---|---|---|---|---|
| Natural Rubber | 100 | 100 | 100 | 100 | 100 | 100 | 100 |
| ISAF Carbon Black | 50 | 50 | 50 | 50 | 50 | 50 | 50 |
| Stearic Acid | 3 | 3 | 3 | 3 | 3 | 3 | 3 |
| N—1,3-Dimethylbutyl-N'—phenyl-p-phenylenediamine | 1 | 1 | 1 | 1 | 1 | 1 | 1 |
| Zinc White | 4.5 | 4.5 | 4.5 | 4.5 | 4.5 | 4.5 | 4.5 |
| N—Oxydiethylene-2-benzthiazyl sulphenamide | 0.6 | 0.6 | 0.6 | 0.6 | 0.6 | 0.6 | 0.6 |
| Sulfur | 2 | 2 | 2 | 2 | 2 | 2 | 2 |
| Rosin Derivative (Sample C) | 0 | 1 | 3 | 5 | 10 | 30 | 35 |
| Hysteresis Loss | | | | | | | |
| Room Temp. | 0.214 | 0.220 | 0.245 | 0.266 | 0.285 | 0.324 | 0.352 |
| 100° C. | 0.207 | 0.211 | 0.220 | 0.249 | 0.272 | 0.316 | 0.339 |
| Cut Resistance | 105 | 120 | 174 | 270 | 345 | 750 | 752 |